Patented Jan. 12, 1932

1,841,309

UNITED STATES PATENT OFFICE

ROBERT T. VANDERBILT, OF NEW YORK, N. Y., ASSIGNOR TO R. T. VANDERBILT COMPANY, INC., OF NEW YORK, N. Y., A CORPORATION OF NEW YORK

PROCESS OF COLORING CLAY

No Drawing. Application filed April 19, 1930. Serial No. 445,837.

This invention relates to an improved process of coloring clay, and more particularly to a process of coloring clay in a continuous manner while the clay is in a dry and finely divided state and otherwise in condition for marketing.

Secondary clays, of the kaolin type, such as those which occur in the States of North and South Carolina and Georgia, occur in the form of veins underground, from which the overburden is removed to uncover the vein of clay. The clay vein may be, for example, around 16 feet thick and usually contains the clay in a wet state, requiring drying and grinding, and often requiring coloring or dyeing, before the clay is marketed. The clay is not ordinarily of uniform character, but contains admixed impurities such as particles of quartz, flakes of mica, etc., and may contain clay particles of different sizes.

One common method of preparing the clay for market has been to admix it with a large amount of water to make it into a thin slurry and then to pass this slurry through a series of troughs with cleats or pockets across the bottom called "riffles" in which the particles of grit are caught while the clay flows in suspension in the water to settling tanks. The dye has been added to the watery mixture to color all particles of the clay. After settling, the dyed clay mud requires drying to remove the large amount of water which it retains.

The process of the present invention is one which is carried out in connection with the drying and dry grinding of clay in a continuous manner, and in which the dyeing or coloring of the clay is carried out after the drying and grinding operation and while the clay is in its state of ultimate subdivision or fineness preparatory to marketing.

In one of the important embodiments of the invention, the clay is subjected to drying and dry grinding in a continuous manner and the dried and finely divided clay is then subjected to the coloring treatment as a part of its continuous method of handling, and while the finely divided clay is still hot from the drying operation; although in its broader aspects the process is not limited to the coloring of hot clay.

So also, in one of the important embodiments of the invention, the dried and pulverized clay is subjected to an air separation or air flotation treatment to remove the fine particles of clay from the coarser particles of clay and grit, etc., and the finely divided air floated clay is then collected while still hot and subjected to the coloring treatment in a continuous manner; although in its broader aspects the process is not limited to the coloring of air separated clay.

The improved coloring treatment of the present invention is carried out upon a flowing stream of the finely divided clay, which may or may not have been subjected to an air separation treatment, and which is advantageously still hot from the drying operation, by applying to the clay, preferably in the form of a spray or mist, a solution of a dye, so that the dye solution penetrates part of the clay and is absorbed thereby and colors part of the clay particles, and the clay is then further treated as a part of the continuous process to effect uniform distribution of the colored clay particles among those which have not been colored so as to produce a composite colored clay product containing dyed particles distributed with substantially uniform distribution throughout the entire body of clay.

The treatment of the wet clay to convert it into a form suitable for marketing requires that the clay shall be dried and crushed. The wet mined clay may be directly crushed in a rock crusher such as between rolls spaced say ½ inch apart, or the clay can be first air dried before the first rough crushing. In the winter time, when the water contained in the clay is frozen, a hammer mill type of preliminary crusher can be employed. The rough crushed clay is then subjected to drying, preferably in rotary driers, and as a continuous operation. The clay entering the drier is more or less in small lump or pellet form, and the dried clay may still be to a considerable extent in the form of small lumps or pellets.

The dried clay is then subjected to further grinding or crushing to break up the lumps and separate the clay into fine particles.

When this crushing is carried out upon the dried clay immediately after drying, the clay will still be hot and at a high temperature at the end of the crushing operation.

Further separation of the fine clay from admixed grit will ordinarily be necessary or desirable, and, for that purpose, an air separation treatment is advantageously employed, such as an air separation treatment in a selective type of air separator. Such a selective separation can be carried out in the "Gayco" dry centrifugal separator or in the "Sturtevant" selective type of separator. In such separator, the air is repeatedly recirculated and brought into contact with the hot finely divided clay and removes the finer particles of the clay by a selective air separation treatment. The clay thus separated from the main body of clay in the separator is collected from the air and the remaining body of clay can then be subjected to further separation in another air separator. In practice, a series of two or three or more of these separators can be employed in series, with progressive removal of the fine clay particles, leaving the coarser clay particles and particles of grit, etc., behind to be discharged as a coarser clay product.

The finely divided clay which is separated by the selective air separation is collected while it is still hot and is conveyed by a suitable conveyor, such as a screw conveyor, to a place of storage or packaging or shipment.

In carrying out the present process I subject the finely divided clay, after the air separation treatment, and before storing or packaging or shipment, to the dyeing or coloring treatment by applying the dye admixed with water to a flowing stream of the finely divided clay, the dye preferably being applied in the form of a fine spray or mist, for example, by spraying a regulated amount of the dye solution continuously on to a moving body of the fine clay. The spraying of the hot clay with the dye solution results in the distribution of the mist or spray over the moving clay so that the dye solution is absorbed by the clay particles which come in contact with the particles of spray or mist. This results in the dyeing of some of the clay particles and the absorption of the water of the dye by the clay particles, but with agitation of the clay, the dyed particles are admixed with the undyed particles and distributed in a uniform manner throughout the clay mass. The heat of the clay will serve to remove any excess of water applied with the dye, although, if the amount of dye solution is sufficiently small, the water may be so distributed throughout the clay mass as to be unobjectionable even where the clay has been cooled before the dye is applied and where the water of the dye solution remains to a greater or less extent in the dyed clay.

The admixing of the dyed particles of fine clay with the undyed particles can be carried out as a part of the continuous movement of the clay, for example, in a worm conveyor, as it leaves the air separating machine and passes to the storage bins or packages. A worm conveyor is an efficient mixing device for mixing the dyed fine clay particles with the undyed particles to give a composite product in which the dyed particles are distributed throughout the mass, to give to the clay a uniform colored appearance.

The nature and amount of the dye employed can be varied, depending upon the purpose for which the clay is to be used, but for dyeing light colored clay to give it a bluish color so that it may be used in paper making, a blue dye, such as dry acid blue B can be employed, using, for example, 0.0375 pounds of dye per ton of finely divided clay and using the dye in solution in plain water so that about 2.5 gallons of the solution are added for each ton of finely divided clay. The application of such a dye solution to the finely divided clay will result in an intense coloration of some of the clay particles, but with uniform distribution of the dyed clay particles throughout the undyed clay particles, the effect is to give a more or less uniform dyed appearance to the clay, for example, a bluish appearance such as is desirable for clay for paper making purposes.

While the dyeing of clay is desirable for certain purposes, it may not be desirable for other purposes. For example, the bluing of clay is important where the clay is to be employed for paper making, but is objectionable where the clay is to be used for certain kinds of paint or other purposes. If the entire amount of clay is colored or dyed before it is crushed and before it is separated into different portions, the clay cannot thereafter be separated into a dyed portion and an undyed portion; but by applying the dyeing treatment to the finely divided air floated clay, after it has been separated from the remainder of the clay, it is possible to obtain a grit-free dyed clay which is desired in the paper industry, while leaving behind in the air separator an undyed clay which is adapted for use, for example, for the paint industry where coloring is not desired. It is important, in the paper industry, to obtain clay which is free from grit, and the present process of dyeing the finely divided air floated clay gives directly a grit-free dyed clay, leaving the remainder of the clay, which may contain admixed grit, and which may be valuable for paint and other purposes, in an undyed state.

The dyeing of the finely divided clay is, moreover, combined with the handling of the clay, as a part of a continuous process, so that the clay requires a minimum of additional handling. For example, where the clay is subjected to rough crushing, to drying in a rotary drier, and then to air separation, the air separated clay must be collected and conveyed to a storage bin or to a place of packaging and shipment. The dyeing of the finely divided clay while it is being conveyed from the air separator to the place of storage or shipment, and the utilization of a worm conveyor for accomplishing an intimate inter-mixture of the dyed particles with the undyed particles, and the utilization of the heat contained in the still hot clay particles for removing any excess of water added with the dye, enables the clay to be conveyed continuously from the air separator to the storage or packaging or shipping containers, reaching them not only in a dyed state but also with the dye uniformly distributed throughout the clay.

While I have referred to the use of a worm conveyor for conveying the clay from the air separator to the storage or shipping or packaging department of the plant, the process is not limited to the use of such a worm conveyor, although that type of conveyor is advantageous as a conveyor and as a mixer. A suitable squirrel cage type of mixer could be employed for mixing the dyed clay particles with the undyed clay particles to give a uniformly appearing clay product, and this product could then be conveyed to the place of storage, packaging or shipment, as a finished, dyed clay product.

It will thus be seen that the present invention provides an improved process of preparing clay in a continuous manner for the market, with dyeing of the finely divided finished clay in a continuous manner and as a part of the mill operation and handling of the clay. It will further be seen that the present process provides for the direct production of finely divided air-floated and grit-free dyed clay while at the same time permitting the simultaneous production of undyed clay suitable for other purposes.

I claim:—

1. The improvement in the dyeing of clay which comprises drying and disintegrating the clay to convert the clay into the desired fineness for marketing, and dyeing the fine dried clay by applying thereto, in a continuous manner, a solution of a dye to dye certain of the clay particles without dyeing others, and continuously mixing the dyed clay particles with the undyed clay particles to give a clay product of uniformly dyed appearance, the amount of water added with the dye solution being so limited that subsequent treatment for the removal thereof is unnecessary, and so that the dyed clay can be directly conveyed to storage, packaging or shipping containers.

2. The process according to claim 1 in which the dye solution is applied to the finely divided clay while it is still hot from the drying operation so that the heat of the clay will assist in removing water added in the dye solution.

3. The process according to claim 1 in which the dried and crushed clay is subjected to air separation and the finely divided air-separated clay is subjected to the continuous dyeing treatment to give directly a dyed grit-free clay, while leaving the portion of the clay which has not been separated by air-floating in an undyed condition.

4. The method of treating clay which comprises rough crushing the clay, then drying it in a continuous manner by heating it to a high temperature, then crushing the dried clay to convert it into a finely divided state, then subjecting the dried and finely divided clay, while still hot, to a selective air separation treatment to remove fine particles of the clay in a substantially grit-free condition, collecting the finely divided clay in a continuous manner and while still hot from the drying operation and applying thereto in a continuous manner a dye solution to dye some of the clay particles without dyeing others, and intimately mixing the resulting clay in a continuous manner to effect uniform distribution of the dyed clay particles throughout the undyed clay particles.

In testimony whereof I affix my signature.

ROBERT T. VANDERBILT.